United States Patent
Sekiguchi

(10) Patent No.: US 6,272,155 B1
(45) Date of Patent: *Aug. 7, 2001

(54) FIBER BUNDLE AND LASER APPARATUS USING THE FIBER BUNDLE OF MANUFACTURING THE SAME

(75) Inventor: Hiroshi Sekiguchi, Tokyo (JP)

(73) Assignee: Hoya Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,130

(22) Filed: Jun. 30, 1998

(30) Foreign Application Priority Data

Jun. 30, 1997 (JP) .................................................... 9-173410
Jun. 30, 1997 (JP) .................................................... 9-173411

(51) Int. Cl.[7] ......................................................... H01S 3/30
(52) U.S. Cl. ............................... 372/6; 385/89; 385/115; 372/71
(58) Field of Search .............................. 372/6, 71, 75; 385/89, 115, 120

(56) References Cited

U.S. PATENT DOCUMENTS

| 5,084,882 | * | 1/1992 | Hughes ................................. 372/6 |
| 5,302,999 | | 4/1994 | Oshida et al. . |
| 5,513,195 | | 4/1996 | Opower et al. . |
| 5,519,801 | | 5/1996 | Le Noane et al. . |
| 5,566,196 | | 10/1996 | Scifres . |
| 5,966,491 | * | 10/1999 | DiGiovanni ......................... 385/89 |

FOREIGN PATENT DOCUMENTS

| WO 94 17575 | 8/1994 | (DE) . |
| 63 172105 | 7/1988 | (EP) . |
| 0 695 003 | 1/1996 | (EP) . |
| 0 709 698 | 5/1996 | (EP) . |

OTHER PUBLICATIONS

H. Zellmer et al, High–power cw neodymium–doped fiber laser operating at 9.2 W with with high beam quality, Nov. 29, 1994, 578–580.

* cited by examiner

Primary Examiner—Darren Schuberg
(74) Attorney, Agent, or Firm—Sughrue, Mion, Zinn Macpeak & Seas, PLLC

(57) ABSTRACT

In a fiber bundle (100) in which one ends of a plurality of optical fibers including cores (111a–111p), respectively, are bundled as a bundled position, the fiber bundle includes in the bundled portion a clad (112a–112p) having a refractive index less than that of each of the cores and surrounding the cores so that the cores are positioned near to each other with a minimum distance left between two adjacent ones of the cores. The minimum distance is decided so that transverse modes of laser beams propagated through the above-mentioned two adjacent ones of the cores do not affect each other. Typically, in the fiber bundle, different ends of the optical fibers are kept separated as a separated portion without being bundled. In this case, each of the cores may include a laser active material which produces, when excited by an excitation beam incident to the different end of each of the optical fibers, the laser beam propagated through each of the cores from the different end of each of the optical fibers to the one end of each of the optical fibers.

3 Claims, 14 Drawing Sheets

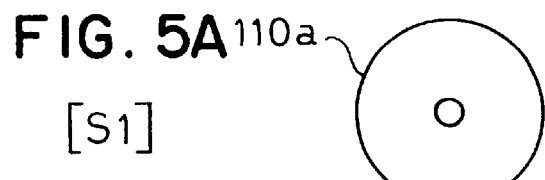
FIG. 5A [S1]
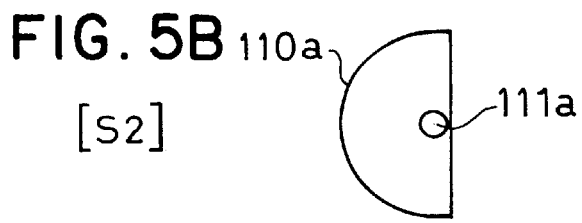
FIG. 5B [S2]
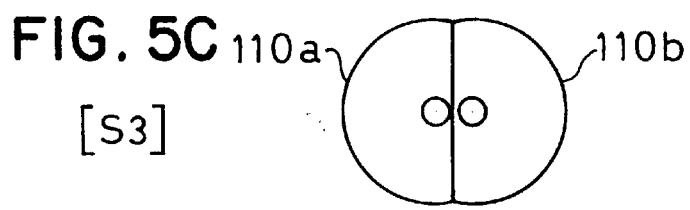
FIG. 5C [S3]
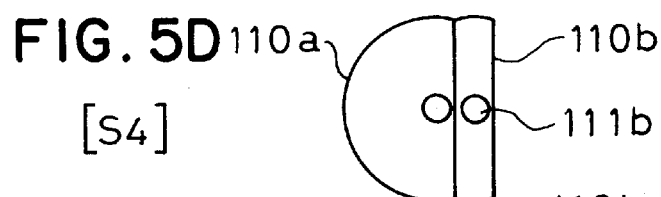
FIG. 5D [S4]
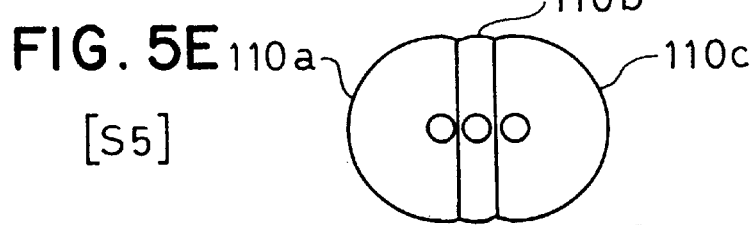
FIG. 5E [S5]
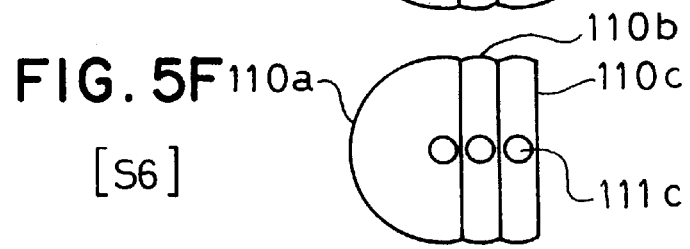
FIG. 5F [S6]
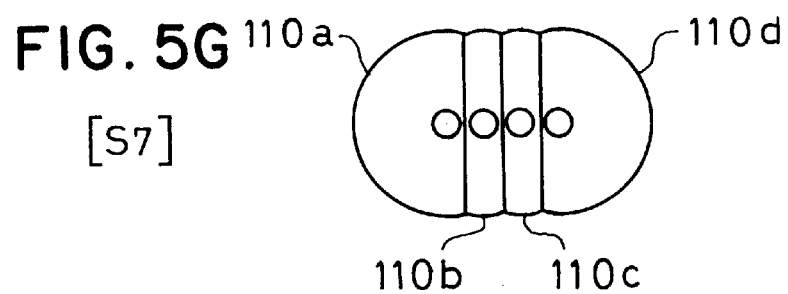
FIG. 5G [S7]

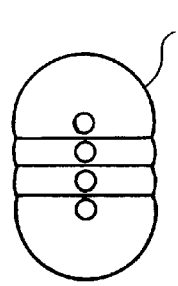
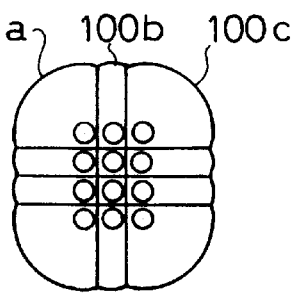
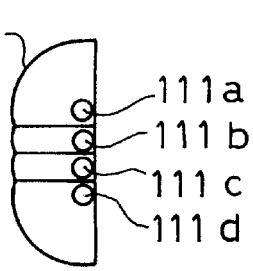
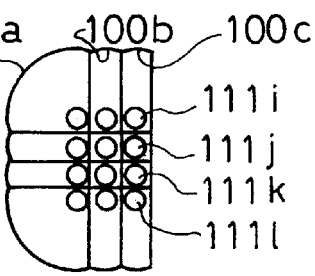
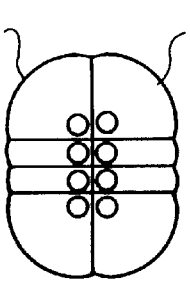
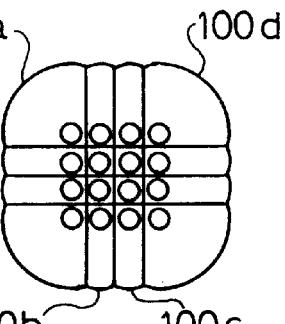
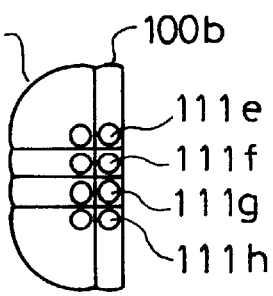

FIG. 9A [S21]
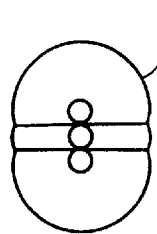
FIG. 9B [S22]
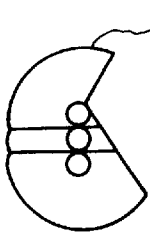
FIG. 9C [S23]
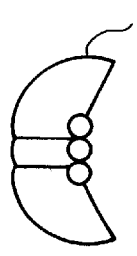
FIG. 9D [S24]
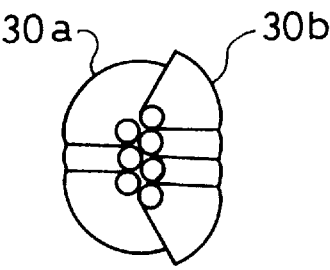
FIG. 9E [S25]
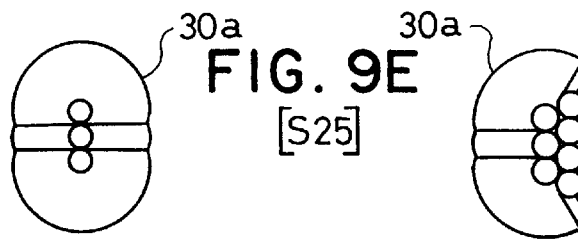
FIG. 9F [S26]
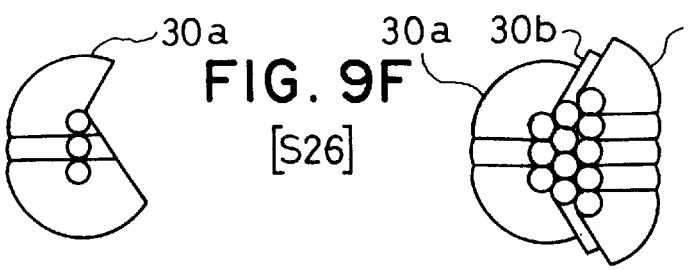
FIG. 9G [S27]
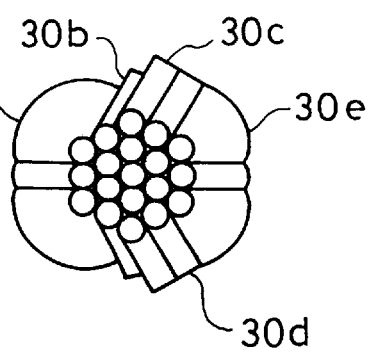

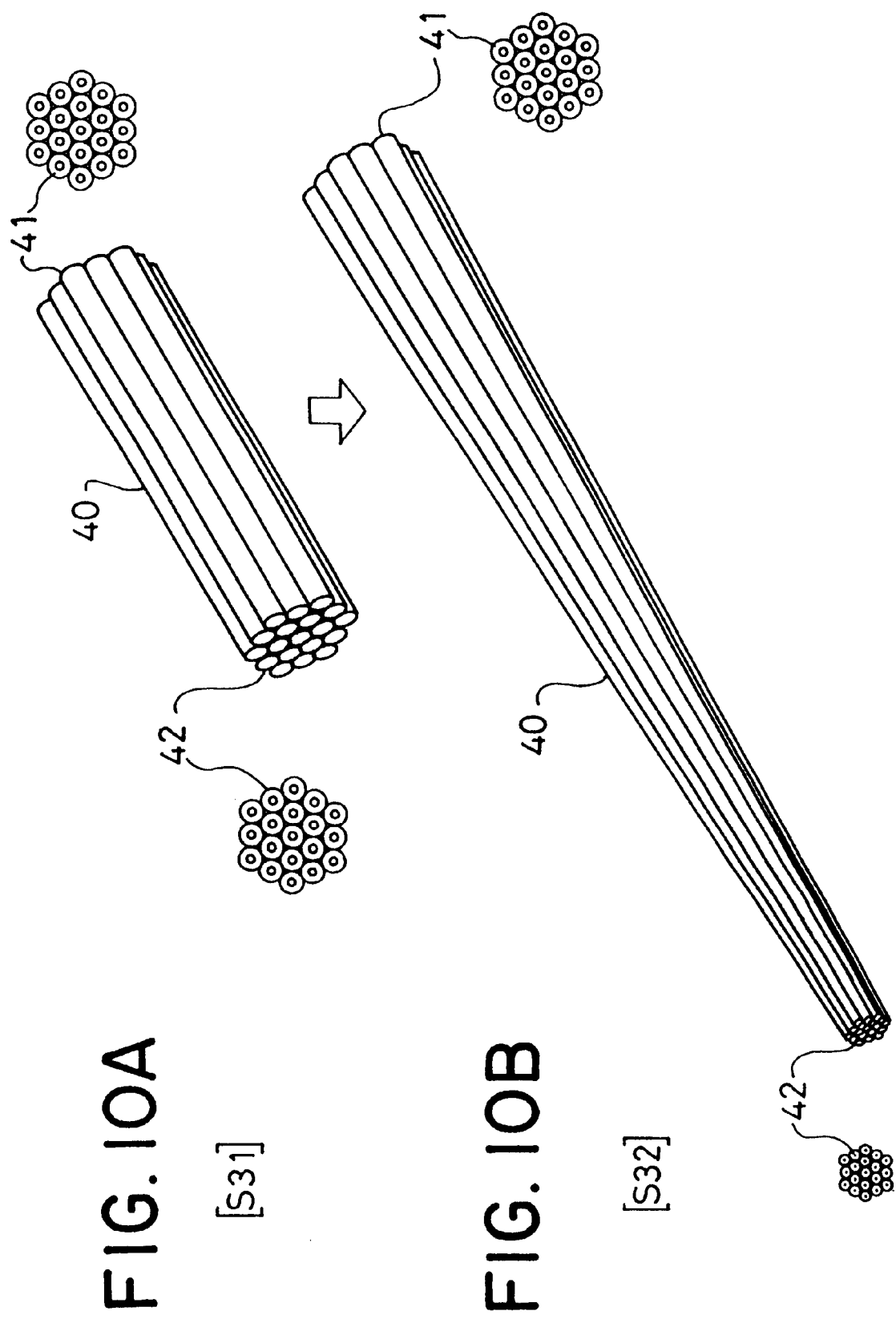

FIBER BUNDLE AND LASER APPARATUS USING THE FIBER BUNDLE OF MANUFACTURING THE SAME

BACKGROUND OF THE INVENTION

This invention relates to a fiber bundle composed of a plurality of optical fibers and a method of manufacturing the fiber bundle.

This invention relates also to a laser apparatus and a laser machining apparatus, each apparatus using the fiber bundle.

In the fields of optical communication and laser machining, it is desired to develop a laser apparatus which is greater in output power and is less expensive. An optical fiber laser apparatus is known for its greater potential to meet the above-mentioned demand.

In the optical fiber laser apparatus, a single transverse mode of laser oscillation can relatively easily be achieved by appropriately selecting a core diameter and a difference in refractive index between a core and a clad. In addition, by confining a light beam at a high density, it is possible to enhance an interaction between a laser active material and the light beam. Furthermore, by increasing the length of an optical fiber, the interaction can be extended so as to produce a high-quality laser beam with a high efficiency. Because of the above-mentioned superior characteristics, it is possible by the use of the optical fiber laser apparatus to obtain at a relatively low cost a laser beam excellent in quality and having a transverse mode free from an influence of the intensity of laser output, heat, and vibration.

In order to realize further increase in output power and efficiency of the optical fiber laser apparatus, it is necessary to efficiently introduce an excitation beam into the optical fiber in a region (typically, a core) where laser active ions, pigments, or other luminescent centers (hereinafter referred to as the "laser active material") are doped. Generally, when the core diameter is determined so as to satisfy a single-mode waveguide condition, the core diameter is restricted to a value not greater than ten and several micrometers. Therefore, it is generally difficult to efficiently introduce the excitation beam within the core diameter. To overcome the difficulty, proposal is made of a so-called double-clad fiber laser (for example, disclosed in H. Zellmer, U. Willamowski, A. Tunnermann, and H. Welling, Optics Letters, Vol. 20, No. 6, pp. 578–580, March, 1995).

The double-clad fiber laser comprises a core, a first clad surrounding the core and having a first refractive index lower than that of the core, and a second clad arranged outside of the first clad and having a second refractive index lower than the first refractive index. With this structure, an excitation beam introduced into the first clad is kept confined within the first clad during propagation because total internal reflection occurs due to the difference in refractive index between the first and the second clads. During the propagation, the excitation beam repeatedly passes through the core to excite the laser active material contained in the core. In the double-clad fiber laser, the excitation beam is introduced into the first clad. The first clad has a sectional area corresponding to several hundreds to one thousand times that of the core. Therefore, a greater quantity of the excitation beam can be introduced so as to increase the output power.

Thus, the double-clad fiber laser is advantageous in that the oscillation efficiency is high and that the transverse mode of oscillation is a single mode and stable. Therefore, the double-clad fiber laser has a high ability as a machining laser for fine cutting or fine welding.

However, the double-clad fiber laser is disadvantageous in that its laser output is restricted due to the increase of loss resulting from the nonlinear effect such as Brillouin scattering and Raman scattering at the core and to the damage by intense light at the core. With a core material currently available, the double-clad fiber laser is restricted in output power to a range between several tens watts (W) to hundreds and several tens watts (W).

In order to overcome the above-mentioned disadvantage, it is a straightforward idea to increase the core diameter. However, the increase in core diameter of the fiber laser inevitably results in multiple modes of laser oscillation. In case of the multiple modes, the stability of the transverse mode as the advantage of the fiber laser will lost. In this event, the transverse mode of the laser output readily varies due to the intensity of the output, slight vibration of the fiber, and the change in shape. For example in laser machining, this results in unstable distributions of light intensity at a condensing point.

As another approach to compensate the disadvantage of the double-clad fiber laser, it is proposed to use a fiber bundle (a bundle of fibers). This is because a bundle of a plurality of fiber lasers of a single transverse mode provides the increase in output power corresponding to the number of the fibers.

However, if a plurality of fiber lasers of a single transverse mode are simply bundled, each core is surrounded by a clad far greater (about 100 times in diameter) than the core. Therefore, even if the fiber bundle is used in a laser apparatus, the cores as emission points are dotted in a wide spread so that the luminance is decreased.

SUMMARY OF THE INVENTION

In view of the above, it is an object of this invention to provide a fiber bundle in which optical fibers are bundled so that a plurality of laser beams of a single transverse mode are condensed in a small area.

It is another object of this invention to provide a method of manufacturing a fiber bundle, which is capable of bundling a plurality of optical fibers with their cores arranged at a small interval.

It is still another object of this invention to provide a laser apparatus which is capable of producing a laser beam high in luminance and output power with a stable single transverse mode maintained.

it is yet another object of this invention to provide a laser machining apparatus which is capable of carrying out laser machining by the use of a laser beam high in luminance with a stable single transverse mode maintained.

Fiber bundles according to this invention are as follows:

(1) A fiber bundle in which one ends of a plurality of optical fibers are bundled as a bundled portion, the topical fibers including cores, respectively, a laser beam being propagated through each of the cores, the fiber bundle comprising in the bundled portion a clad having a refractive index less than that of each of the cores and surrounding the cores so that the cores are positioned near to each other with a minimum distance left between two adjacent ones of the cores, the minimum distance being decided so that transverse modes of the laser beams propagated through the two adjacent ones of the cores do not affect each other.

(2) A fiber bundle as mentioned in Paragraph (1), wherein different ends of the optical fibers are kept separated as a separated portion without being bundled, the fiber bundle comprising in the separated portion: first clads, each of which has a first refractive index less than that of each of the cores and surrounds each of the cores; and second cores, each of which has a second refractive index less than that of each of the first clads and surrounds each of the first clads.

(3) A fiber bundle as mentioned in Paragraph (2), wherein each of the cores includes a laser active material which produces, when excited by an excitation beam incident to the different end of each of the optical fibers, the laser beam propagated through each of the cores from the different end of each of the optical fibers to the one end of each of the optical fibers.

(4) A fiber bundle as mentioned in Paragraph (1), the laser beam inevitably leaking from each of the cores to the clad as an evanescent wave, wherein the minimum distance is decided so that the evanescent wave leaking from one of the two adjacent ones of the cores do not affect the laser beam propagated through a different one of the two adjacent ones of the cores.

(5) A fiber bundle as mentioned in Paragraph (4), wherein the minimum distance is longer than a first distance and shorter than a second distance, the first distance being decided so that the evanescent wave has a first attenuated level not greater than 0.9 times an initial level of leakage energy of the evanescent wave when the evanescent wave is propagated within the clad by the first distance, the second distance being decided so that the evanescent wave has a second attenuated level not less than 0.01 times the initial level of the leakage energy of the evanescent wave when the evanescent wave is propagated within the clad by the second distance.

(6) A fiber bundle in which one ends of a plurality of optical fibers are bundled as a bundled portion while different ends of the optical fibers are kept separated as a separated portion without being bundled, the optical fibers including cores, respectively, a laser beam being propagated through each of the cores from the different end of each of the optical fibers to the one end of each of the optical fibers, wherein the bundled portion has a length not greater than 10000 times a wavelength of the laser beam; the fiber bundle comprising in the bundled portion: a clad having a refractive index less than that of each of the cores and surrounding the cores so that the cores are positioned near to each other so that transverse modes of the laser beams propagated through two adjacent ones of the cores do not affect each other.

(7) A fiber bundle as mentioned in Paragraph (6), wherein each of the cores includes a laser active material which produces, when excited by an excitation beam incident to the different end of each of the optical fibers, the laser beam propagated through each of the cores from the different end of each of the optical fibers to the one end of each of the optical fibers.

Fiber bundle manufacturing methods according to this invention are as follows:

(8) A method of manufacturing a fiber bundle in which one ends of a plurality of optical fibers are bundled as a bundled portion, each of the optical fibers including a core and a clad surrounding the core, the method comprising the steps of partially removing the clads of the one ends of the optical fibers from the optical fibers, respectively; and fixing clad-removed portions of the optical fibers to each other to obtain the bundled portion.

(9) A method of manufacturing a fiber bundle in which one ends of a plurality of optical fibers are bundled as a bundled portion, each of the optical fibers including a core and a clad surrounding the core, the method comprising the steps of partially removing the clads of the one ends of first and second fibers of the optical fibers from the first and the second fibers, respectively, by an amount required to position the cores of the first and the second fibers near to each other; fixing clad-removed portions of the first and the second fibers to each other to obtain an intermediate fiber bundle; and partially removing the clad of the one end of the second fiber of the intermediate fiber bundle and the clad of the one end of a third fiber of the optical fibers from the intermediate fiber bundle and the third fiber, respectively, by the amount required to position the core of the third fiber near to the core of the second fiber of the intermediate bundle; and fixing clad-removed portions of the intermediate bundle and the third fiber to each other to obtain the bundled portion.

(10) A method of manufacturing a fiber bundle in which one ends of a plurality of optical fibers are bundled as a bundled portion, each of the optical fibers including a core and a clad surrounding the core, the method comprising the steps of bundling the one ends of the optical fibers together; and wiredrawing the one ends of the optical fibers with the one ends of the optical fibers bundled together to reduce an interval between the cores of the one ends of the optical fibers.

Laser apparatuses according to this invention are as follows:

(11) A laser apparatus for producing an output laser beam, wherein the laser apparatus comprising a fiber bundle in which one ends of a plurality of optical fibers are bundled as a bundled portion, the optical fibers including cores, respectively, each of the cores including a laser active material which produces a laser beam propagated through each of the cores towards the one end of each of the optical fibers, the fibers bundle outputting the laser beams from the one ends of the optical fibers collectively as the output laser beam; and exciting means for exciting the laser active material of each of the cores to make a laser active material of each of the cores produce the laser beam the fiber bundle comprising in the bundled portion a clad having a refractive index less than that of each of the cores and surrounding the cores so that the cores are positioned near to each other with a minimum distance left between two adjacent ones of the cover, the minimum distance being decided so that transverse modes of the laser beams propagated through the two adjacent ones of the cores do not affect each other.

(12) A laser apparatus as mentioned in Paragraph (11), wherein different ends of the optical fibers are kept separated as a separated portion without being bundled in the fiber bundle; the fiber bundle comprising in the separated portion first clads, each of which has a first refractive index less than that of each of the cores and surrounds each of the cores; and second clads; each of which has a second refractive index less than that of each of the first clads and surrounds each of the first clads.

(13) A laser apparatus as mentioned in Paragraph (12), wherein the exciting means excites the laser active material of each of the cores by introducing an excitation beam into the first clad of the different end of each of the optical fibers.

(14) A laser apparatus as mentioned in Paragraph (11), wherein the laser apparatus further comprises condensing means for condensing the output laser beam as a condensed laser beam.

BRIEF DESCRIPTION OF THE DRAWING

FIGS. 5A through 5G are views showing a first half of a manufacturing process of the fiber bundle;

FIGS. 6A through 6G are views showing a second half of the manufacturing process of the fiber bundle;

FIGS. 9A through 9G are views showing a manufacturing process according to the embodiment of this invention;

FIGS. 10A and 10B are views showing a first half of a manufacturing process of a fiber bundle according to a third embodiment of this invention;

DETAILED DESCRIPTION OF THE INVENTION

Figure 1:
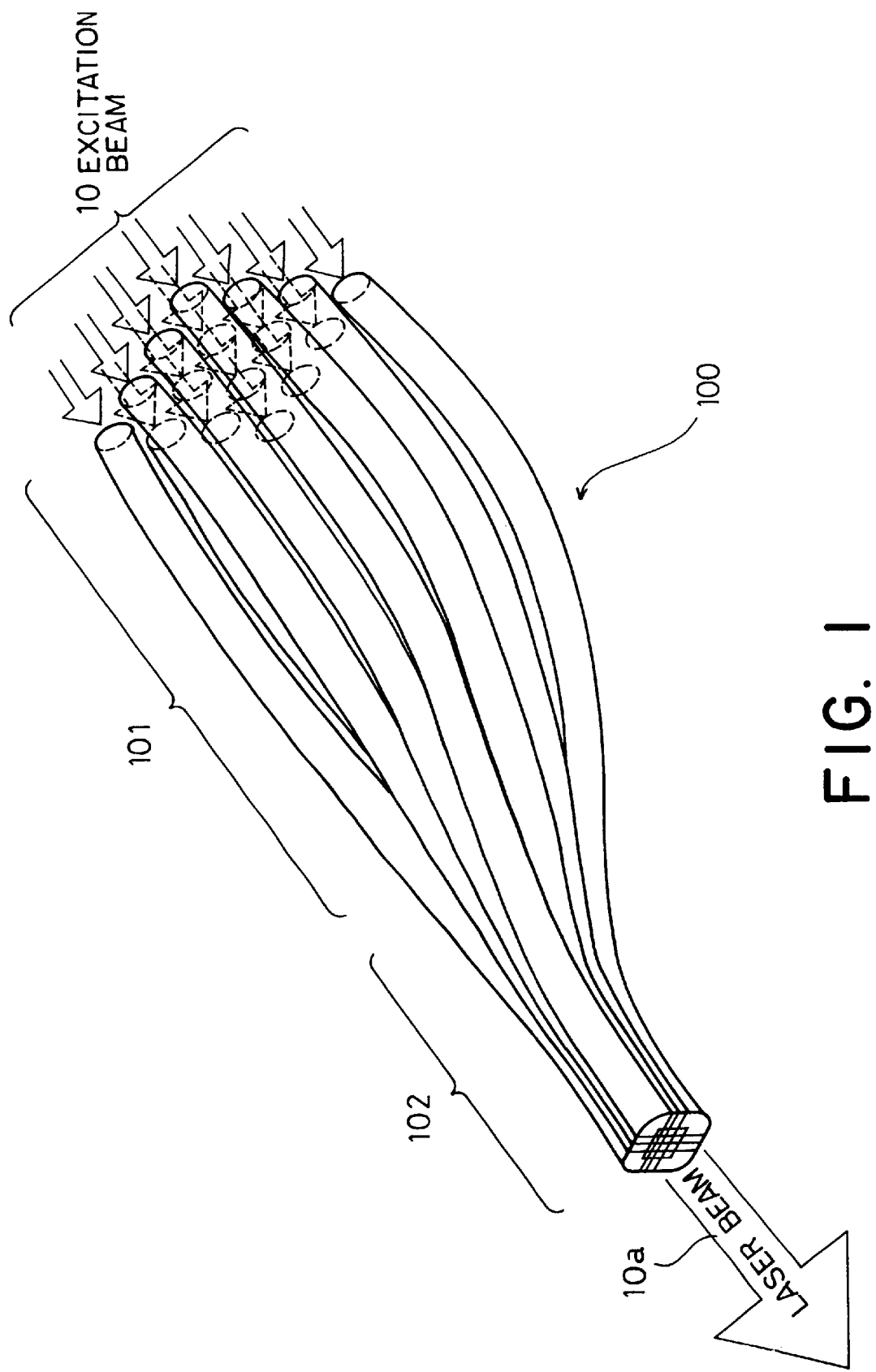
FIG. 1 is a view showing a fiber bundle according to a first embodiment of this invention.

Now, description will be made about several embodiments of this invention with reference to the drawing.

Referring to FIG. 1, a fiber bundle 100 according to a first embodiment of this invention is for use in a double-clad fiber laser apparatus. The fiber bundle 100 comprises sixteen fibers bundled at their one ends.

Excitation beams 10 are incident to an incident end of the fiber bundle 100 at the side of a separated portion 101 where the fibers are separated. Laser beams 10a are emitted from an outgoing end at the side of a bundled portion 102 where the fibers are bundled. In the bundled portion 102, the fibers are bundled in the manner such that a core interval at the outgoing end is minimized so far as transverse modes of propagating laser beams do not affect one another. In order to guide the laser beams emitted from the fibers in a same direction, the cores are kept in parallel to one another within a range not greater than 1 cm from the outgoing end.

Figure 2:
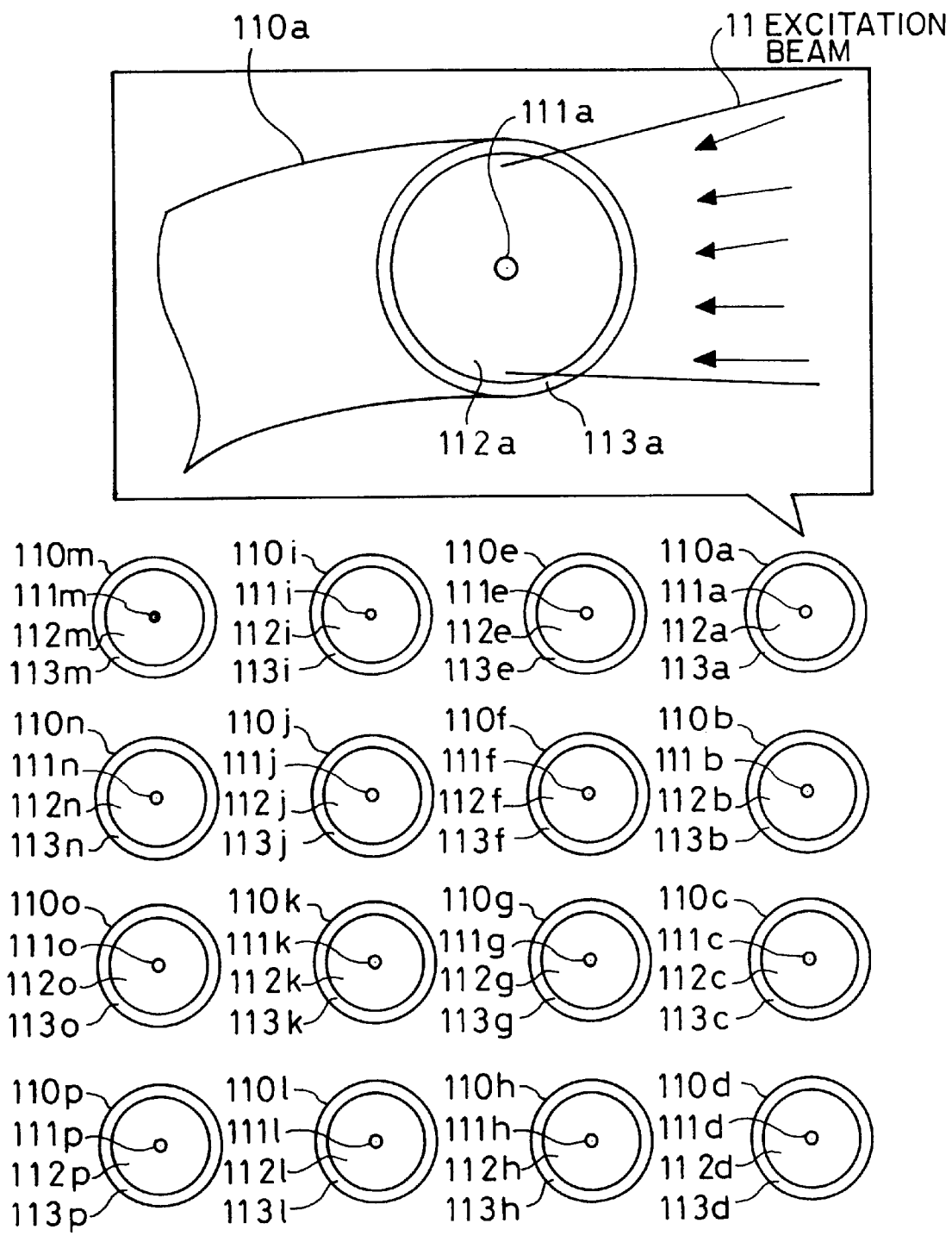
FIG. 2 is an enlarged view of an excitation beam incident end of the fiber bundle.

FIG. 2 shows the excitation beam incident end of the fiber bundle 100. The sixteen fibers 110a through 110p have cores 111a through 111p as waveguide regions arranged at their centers, respectively. Each of the cores 111a through 111p is doped with a laser active material. The cores 111a through 111p are surrounded by first clads 112a through 112p, respectively. The first clads 112a through 112p are less in refractive index than the cores 111a through 111p. The first clads 112a through 112p are surrounded by second clads 113a through 113p, respectively. The second clads 113a through 113p are less in refractive index than the first clads 112a through 112p.

One of the excitation beams 10 for exciting the laser active material contained in the fiber 110a is incident to the first clad 112a. Likewise, the excitation beams 10 are incident to the first clads of the remaining fibers.

Figure 3:
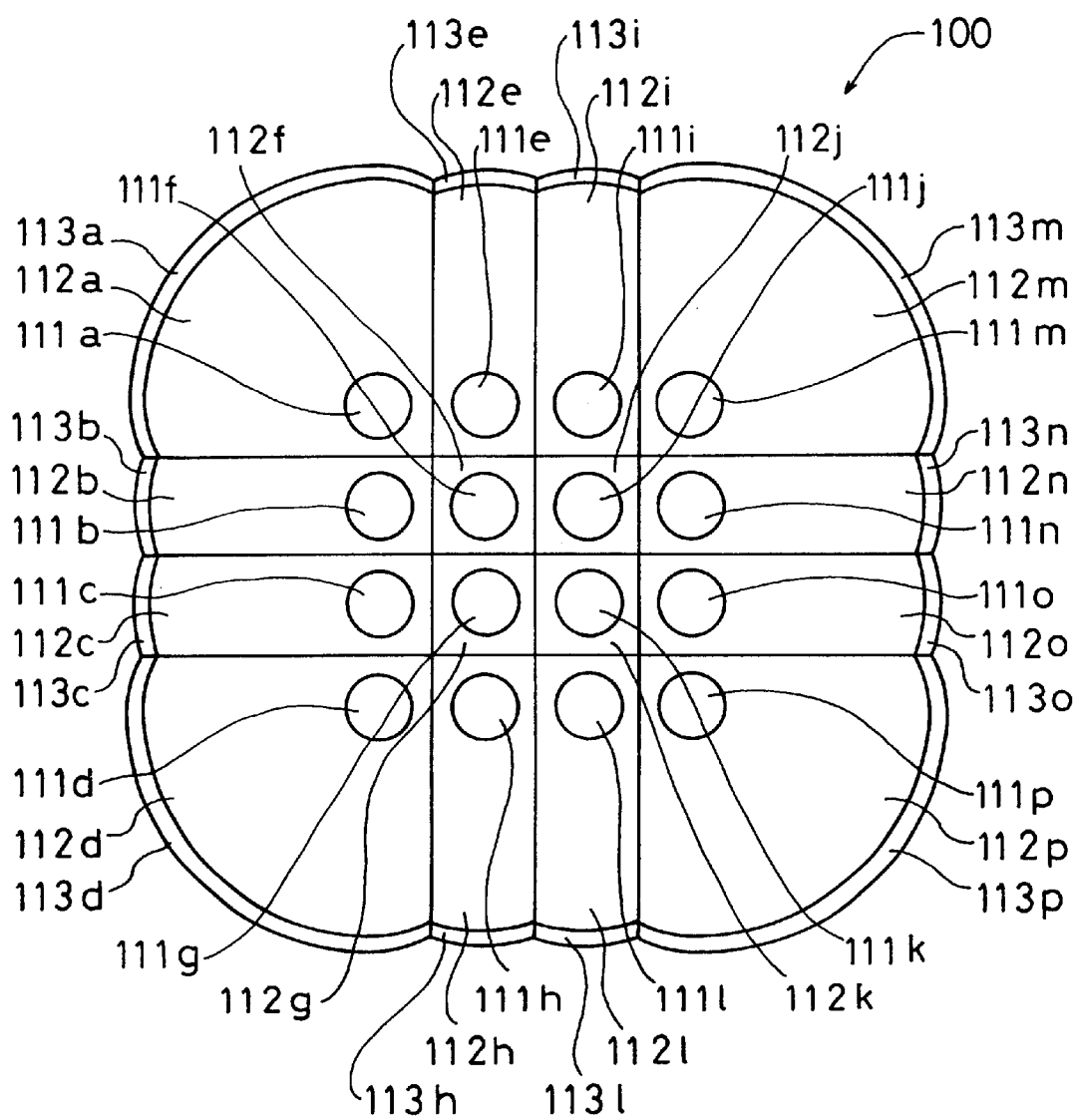
FIG. 3 is an enlarged view of a laser beam outgoing end of the fiber bundle.

FIG. 3 shows the laser beam outgoing end of the fiber bundle 100. At the outgoing end of the fiber bundle 100, the sixteen cores 111a through 111p are arranged at a small interval and concentrated at a center portion. The cores 111a through 111p keep a sufficient interval such that the transverse modes of laser oscillation at every adjacent ones do not affect each other, and are arranged with a density as high as possible.

The distance such that the transverse modes do not affect each other is determined by an evanescent wave of a laser oscillation wavelength.

The evanescent wave is a light beam leaking towards the first clad when the laser beam propagating through the core is totally internally reflected between the core and the first clad. The intensity of the evanescent wave is decreased as it goes away from a boundary between the core and the first clad. When the evanescent wave of high energy enters into an adjacent core, the laser beams effect each other to break a single transverse mode condition.

In order not to break the single transverse mode condition, it is required to arrange the cores adjacent to one another at an interval longer than the distance at which the intensity of the evanescent wave is attenuated to 0.9 times a reference value. The reference value is the intensity of the evanescent wave at the boundary between the core and the first clad. It is noted here that, so far as the length of the bundled portion 102 where the cores are adjacent to one another is not greater than 10000 times the laser wavelength, the transverse modes do not affect one another even if the cores are adjacent at an interval shorter than the distance at which the evanescent wave is attenuated to 0.9 times the reference value. Thus, if the length of the bundled portion 102 is not greater than 10000 times the laser wavelength, the cores can be adjacent more closely. In this case, the cores can be arranged even in tight contact with one another.

On the other hand, if the core interval is too great, the emitted beams are dotted in a wide area in the manner similar to the case where the fibers are simply bundled. In this event, it is impossible to increase the intensity of the emitted beams per unit area. Taking the above into account, it is desired to arrange the cores adjacent to one another at an interval shorter than the distance at which the evanescent wave has an intensity equal to 0.01 times the reference value.

Figure 4:
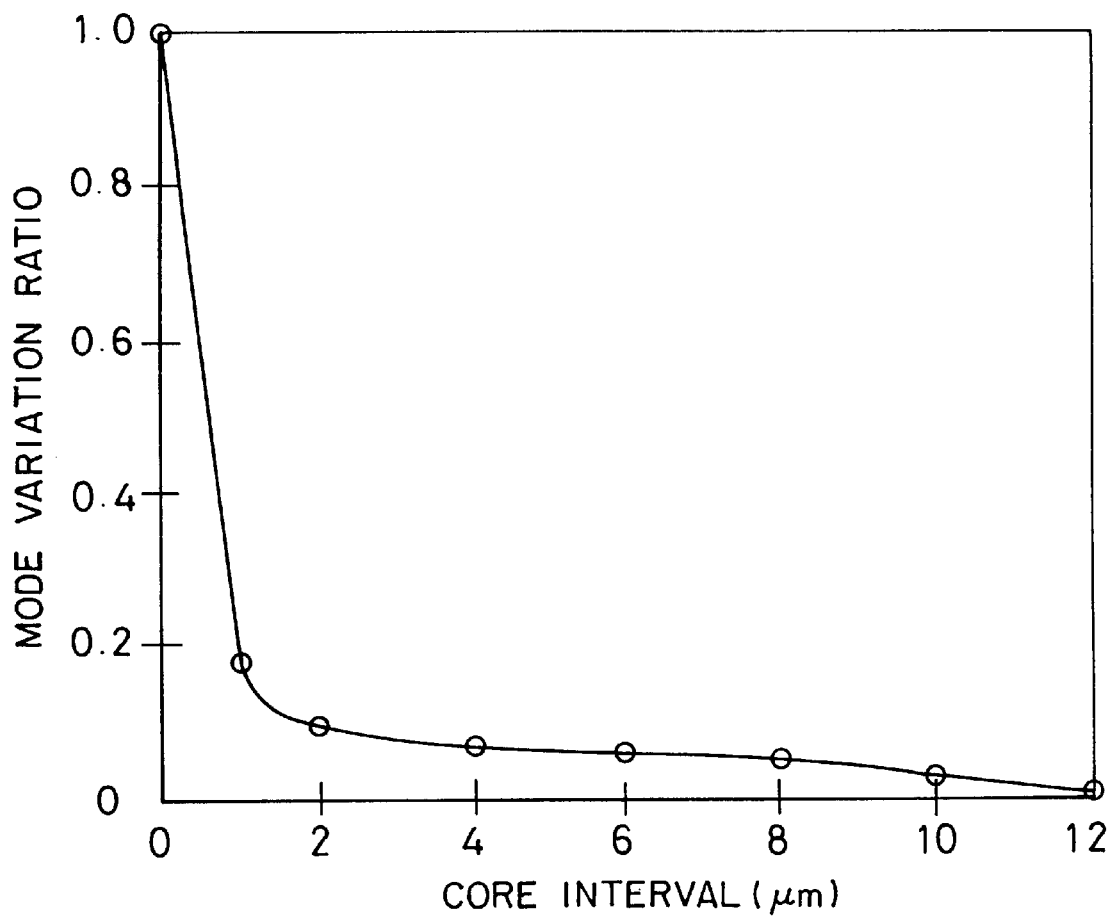
FIG. 4 is a view showing a relationship between a core interval and a mode variation ratio.

Referring to FIG. 4, consideration will be made about the relationship between the core interval and a mode variation ratio. In the figure, an abscissa and an ordinate represent the core interval ($\mu$m) and the mode variation ratio, respectively. Herein, the mode variation ratio represents an intensity variation ratio of the transverse mode of oscillation, assuming that the value 1 corresponds to the state where the cores are in tight contact. As seen from the figure, the mode variation ratio drastically decreases following the increase of the core interval so far as the core interval is not greater than 1 $\mu$m. When the core interval reaches 2 $\mu$m, the intensity variation ratio of the transverse mode oscillation becomes very small. When the core interval exceeds 12 μm, the intensity of the transverse mode of oscillation does not substantially vary any longer.

Now, description will be made about a method of manufacturing the fiber bundle for use in the laser apparatus according to this invention.

Referring to FIGS. 5A through 5G, a first half of a manufacturing process of the fiber bundle 100 will be described. In the figures, the boundary between the first and the second clads is not illustrated. In the following description, a combination of the first and the second clads will simply be referred to as a "clad".

In FIG. 5A, the fiber 110a is fixed to a V groove glass not illustrated in the figure by the use of an adhesive and attached to a dicing saw as a fiber clad grinding unit (step S1).

In FIG. 5B, by the use of the dicing saw, the clad is partly ground and removed to leave the distance of 5 μm from the core 111a (step S2).

In FIG. 5C, the fiber 110b from which the clad is partly ground and removed in the manner similar to the steps S1 and S2 is adhered to the fiber 110a by the adhesive (step S3).

In FIG. 5D, the clad is partly ground and removed to leave 5 μm from the core 111b (step S4).

In FIG. 5E, the fiber 110c from which the clad is partly ground and removed in the manner similar to the steps S1 and S2 is adhered to the fiber 110b by the adhesive (step S5).

In FIG. 5F, the clad is partly ground and removed to leave 5 μm from the core 111c (step S6).

In FIG. 5G, the fiber 110d from which the clad is partly ground and removed in the manner similar to the steps S1 and S2 is adhered to the fiber 110c by the adhesive (step S7).

Thus, a one-dimensional fiber array is formed. The similar one-dimensional fiber arrays, four in total, are prepared. Grinding of the clads and adhesion of the fibers are alternately carried out because, by gradually grinding the clads, machining is carried out with sufficient mechanical strength of the fibers maintained.

Referring to FIGS. 6A through 6G, a second half of the manufacturing process of the fiber bundle 100 will be described. In this process, a two-dimensional fiber array is prepared from the one-dimensional fiber arrays.

In FIG. 6A, the fiber array 100a is fixed to a V groove glass not illustrated in the figure by the use of an adhesive and is attached to a dicing saw (step S11).

In FIG. 6B, by the use of the dicing saw, the clads are partly ground and removed to leave the distance of 5 μm from the cores 111a through 111d (steps S12).

In FIG. 6C, the fiber array 100b from which the clads are partly ground and removed in the manner similar to the steps S11 and S12 is adhered to the fiber array 100a by the adhesive (step S13).

In FIG. 6D, the clads are partly ground and removed to leave 5 μm from the cores 111e through 111h (step S14).

In FIG. 6E, the fiber array 100c from which the clads are partly ground and removed in the manner similar to the steps S11 and S12 is adhered to the fiber 100b by the adhesive (step S15).

In FIG. 6F, the clads are partly ground and removed to leave 5 μm from the cores 111i through 111l (step S16).

In FIG. 6G, the fiber array 100d from which the clads are partly ground and removed in the manner similar to the steps S11 and S12 is adhered to the fiber array 100c by the adhesive (step S17).

Thus, the double-clad fibers are bundled at the outgoing side as the two-dimensional fiber array. By the use of the fiber bundle prepared as described above, it is possible to obtain a fiber laser apparatus having high output power.

In the foregoing description, the fibers are bundled by means of adhesion using the adhesive. However, the fibers may be fusion bonded to one another.

In the foregoing description, the fibers are bundled one by one to prepare the one-dimensional fiber array and then the fiber bundle arrays are bundled to prepare the fiber bundle of this invention. Alternatively, if the mechanical strength during mechanical need not be considered, all fibers are simultaneously bundled after they are cut thin.

Figure 7:
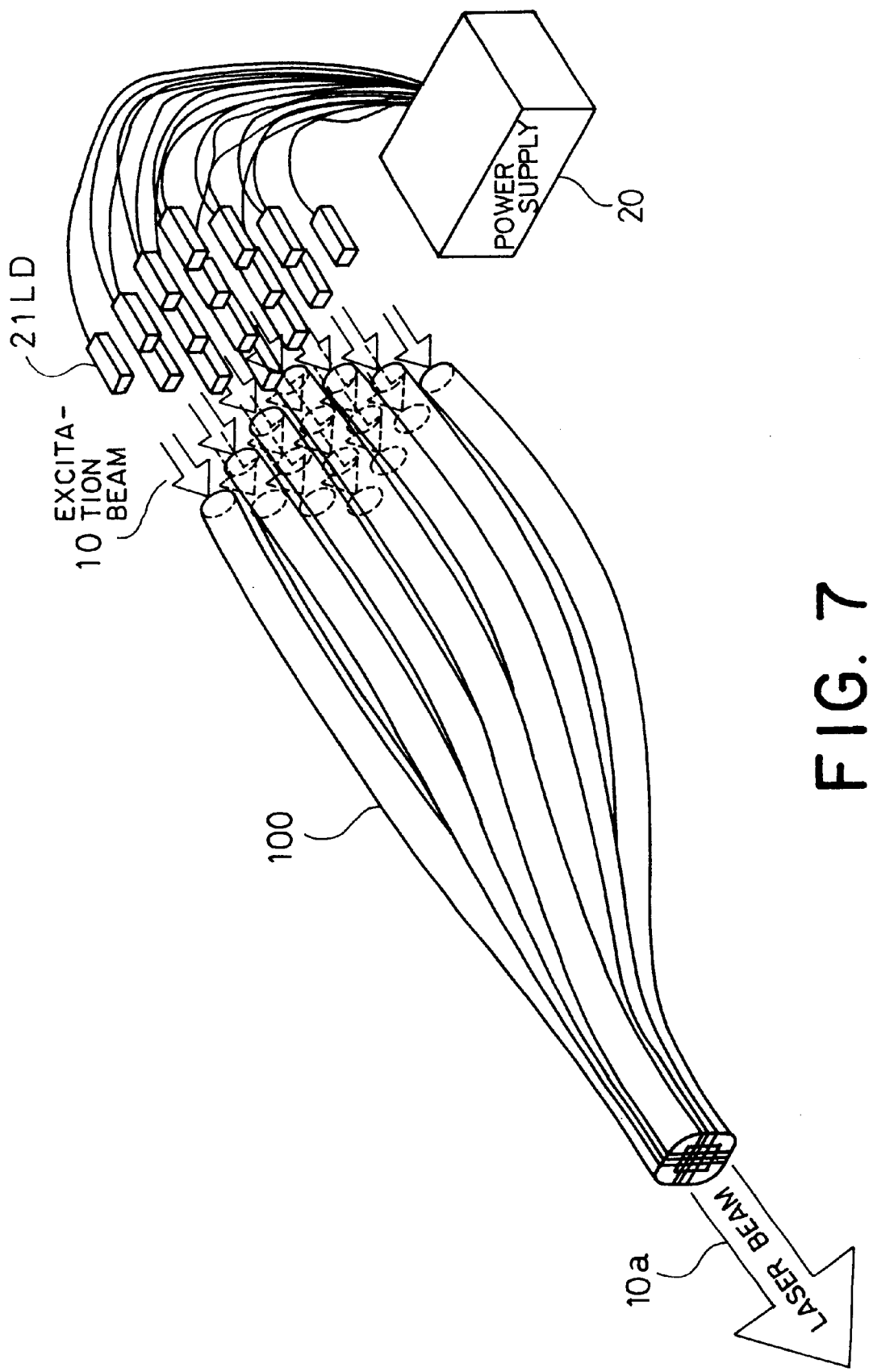
FIG. 7 is a view showing a laser apparatus using the fiber bundle of this invention.

Referring to FIG. 7, the laser apparatus using the fiber bundle of this invention comprises sixteen laser diodes (hereinafter referred to as "LDs") 21 are located at the excitation beam incident end of the fiber bundle 100. The LDs 21 are driven by a power supply unit 20 and produce the excitation beams 10 having a wavelength of 0.8 μm. Each of the excitation beams 10 produced by the LDs 21 propagates through the fiber, repeating the total internal reflection at the boundary between the first and the second clads within the fiber bundle 100. When the excitation beam 10 passes through the core during propagation, the laser active material is excited to produce the laser beam. The energy of the excitation beam is entirely converted into the laser beam before reaching the outgoing end so that the laser beam 10a alone is emitted from the outgoing end.

In the sixteen laser beams 10a produced from the apparatus, the transverse modes of laser output do not vary in dependence upon the intensity of the laser output, heat, vibration, and slight displacement of the fibers. In other words, the laser beams have an extremely stable transverse mode. In addition, since the laser beams are produced from a plurality of cores arranged with a high density, the luminance is equivalent to the upper limit achieved by an optical fiber laser. Since a plurality of the laser beams are emitted as a flux, the laser output can be far greater than that of the fiber laser comprising a single optical fiber.

In the above-mentioned embodiment, the cores are linearly arranged in each of vertical and horizontal directions in the figure. It will be noted that the cores can be arranged with a higher density by changing the arrangement. Now, description will be made about such an embodiment.

Figure 8:
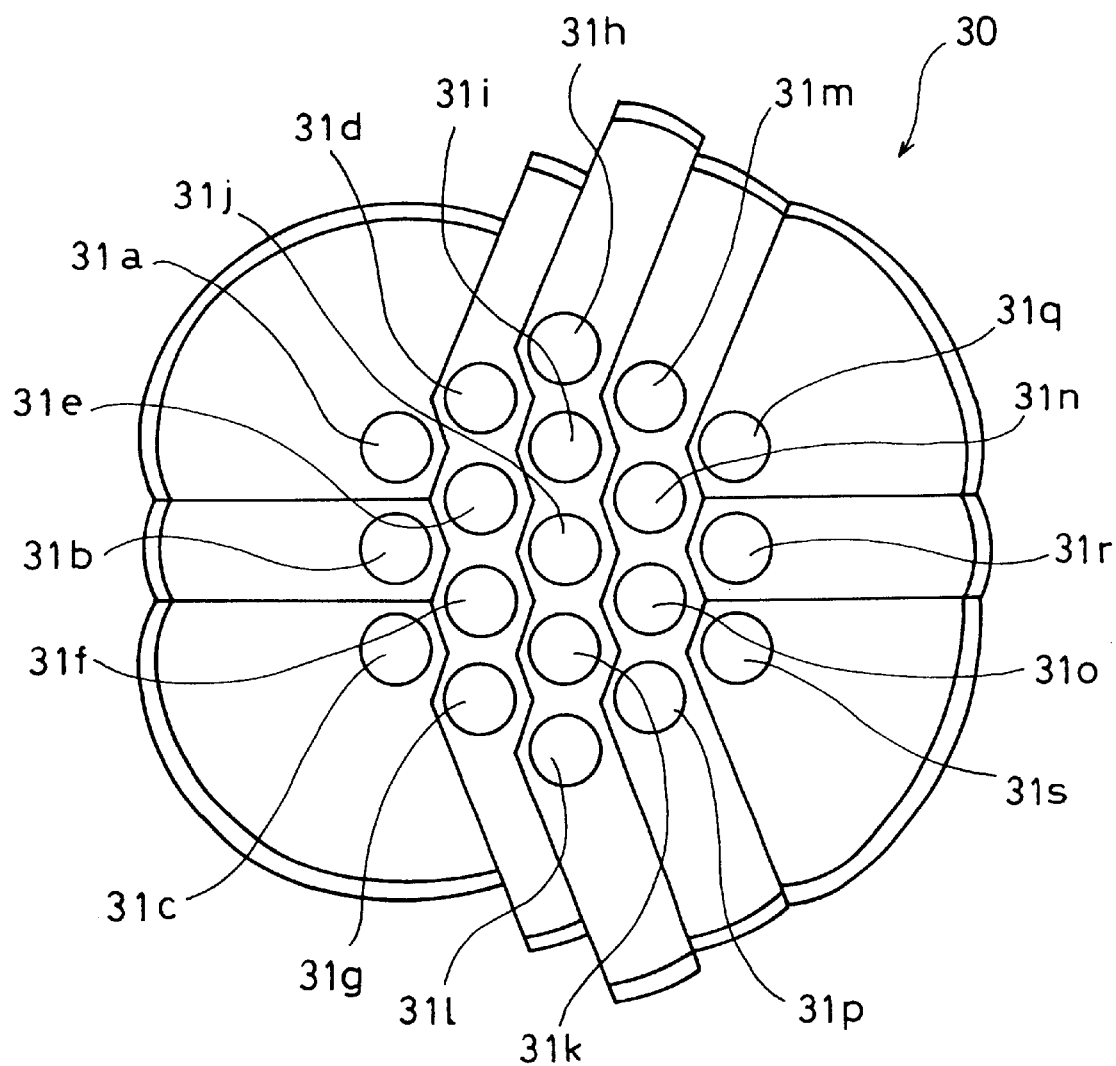
FIG. 8 is a view showing a fiber bundle according to a second embodiment of this invention.

Referring to FIG. 8, description will be made about a fiber bundle 30 according to a second embodiment of this invention. In the figure, a laser beam outgoing end is illustrated. In the fiber bundle 30, three cores 31a through 31c are arranged in a vertical direction in a first column from the left in the figure. In a second column on the right side thereof, four cores 31d through 31g are arranged in the vertical direction. The cores 31d through 31g in the second column have an interval equal to that of the cores 31a through 31c in the first column. A center point of the uppermost and the lowermost cores 31d and 31g in the second column is located at a same level as the center core 31b in the first column.

Likewise, five cores 31h through 31l, four cores 31m through 31p, and three cores 31q through 31s are arranged in a third column, a fourth column, and a fifth column, respectively.

Hereinafter, description will be made about a method of manufacturing the fiber bundle 30. The steps until the one-dimensional fiber arrays are prepared are similar to those (shown in FIGS. 5A through 5G) in the first embodiment and will not be described.

Referring to FIGS. 9A through 9G, a manufacturing process for the fiber bundle 30 will be described.

In FIG. 9A, a one-dimensional fiber array 30a composed of a bundle of three fibers is fixed to a V groove glass not illustrated in the figure by the use of an adhesive and is attached to a dicing saw (step S21).

In FIG. 9B, by the use of the dicing saw, clads are partly ground and removed at an apical angle of 120 degrees around a predetermined position as an apex (step S22).

In FIG. 9C, in the manner similar to the step S22, predetermined portions of the clads are ground and removed (step S23).

In FIG. 9D, another one-dimensional fiber array 30b composed of a bundle of four fibers from which clads are partly ground and removed in the manner similar to the steps S22 and S23 is adhered to the fiber array 30a (step S24).

In FIG. 9E, in the manner similar to the steps S22 and S23, predetermined portions of the clads are removed (step S25).

In FIG. 9F, another one-dimensional fiber array 30c composed of a bundle of five fibers from which clads are partly ground and removed in the manner similar to the steps S22 and S23 is adhered to the fiber array 30b (step S26).

In FIG. 9G, a fiber array 30d composed of a bundle of four fibers and a fiber array 30e composed of a bundle of three fibers are successively adhered (step S27).

Thus, the fiber bundle in which the cores are arranged with a higher density at the outgoing end is prepared.

In the foregoing description, the double-clad fibers for use in the fiber laser are directly bundled. Alternatively, a portion where the cores are arranged closely adjacent and another portion where the laser beams are excited may be individually prepared. In this case, the cores at the outgoing end can be arranged with a high density by wiredrawing. Such structure will hereafter be described as a third embodiment.

Referring to FIGS. 10A and 10B, description will be made about a first half of a manufacturing process of a fiber bundle according to the third embodiment.

In FIG. 10A, a plurality of preforms (glass materials before wiredrawing) are adhered by an adhesive (or fusion-bonded) to be simply bundled as the fiber bundle 40 (step S31). Each of the preforms is not of a double clad type but comprises a core for propagation of the laser beam and a clad surrounding the core. The core is not doped with a laser excitation material. The fiber bundle 40 has both end surfaces 41 and 42 equal in size.

In FIG. 10B, one end of the fiber bundle 40 is subjected to wiredrawing (step S32). As a result, the fiber bundle 40 becomes gradually thin from the end surface 41 towards the end surface 42 so that the end surface 42 is reduced.

Figure 11:
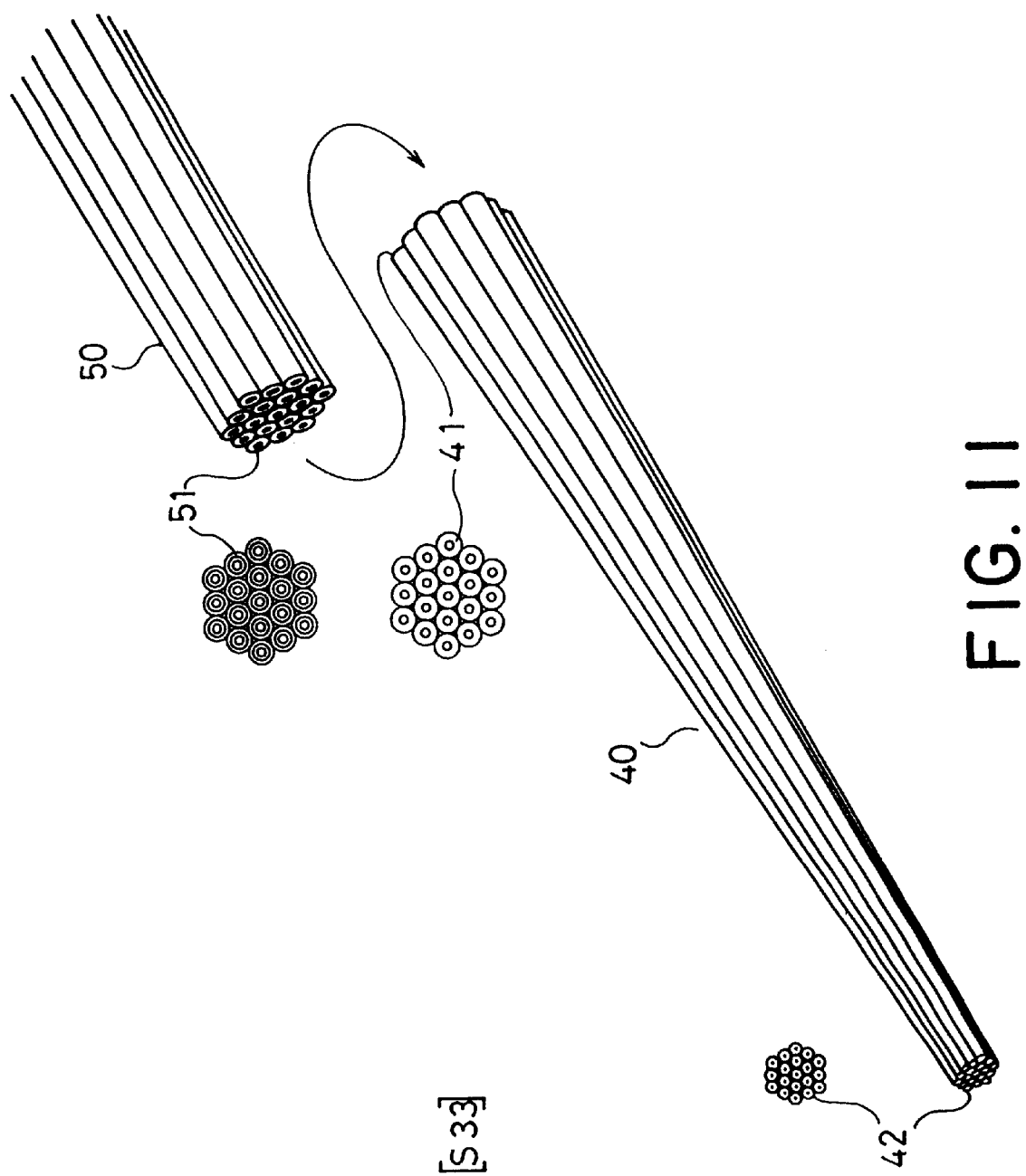
FIG. 11 is a view showing a second half of the manufacturing process of the fiber bundle according to the third embodiment of this invention.

Referring to FIG. 11, description will be made about a second half of the manufacturing process of the fiber bundle according to the third embodiment.

In FIG. 11, double-clad fibers with a laser active material doped in their cores are bundled to prepare a fiber bundle 50. An end surface 51 of the fiber bundle 50 is fitted to the end surface 41 of the fiber bundle 40 to connect the two fiber bundles. Connection is carried out by a known optical fiber connecting technique such as adhesion, fusion-bonding, and butt-joint (step S33).

Thus, the fiber bundle having a function similar to that of the second embodiment can be prepared by wiredrawing. As described above, by arranging a plurality of cores closely adjacent to one another by means of wiredrawing, it is possible to easily prepare the fiber bundle for producing laser beams having a single transverse mode, high output power, and high luminance.

In the description of the manufacturing method in each embodiment, the fiber bundle of this invention is manufactured by subjecting a predetermined region from the end portion of each fiber to machining such as grinding or wiredrawing. Alternatively, such machining can be carried out upon an intermediate portion of the fiber. Specifically, the intermediate portions of the fibers are subjected to grinding or drawing and then combined to prepare the bundle. By cutting the center of the bundled portion, two fiber bundles of this invention can be prepared simultaneously.

Next, consideration will be made about the difference in luminance of the fiber laser apparatus between the case where the fibers are simply bundled and the case where the fiber bundle according to this invention is used.

Consideration will be made about a double-clad fiber laser apparatus using as a laser medium a double clad fiber having a core diameter of 10 $\mu$m (single transverse mode), a first-clad diameter of 900 $\mu$m, and a second-clad diameter of 1000 $\mu$m. In the fiber laser apparatus, a laser beam excited by a LD is incident to the double-clad fiber as an excitation beam. In case where excitation by the LD provides the output power of 150W as an upper limit so far as the loss due to the nonlinear effect is not remarkable, a luminance P1 is given by:

$$P1 = 150W/7.85 \times 10^{-7} = \text{about 191 MW/cm}^2 \qquad \ldots (1)$$

The laser apparatus in which a plurality of the above-mentioned fiber lasers of a single transverse mode are simply bundled has a lumination P2 as follows.

Figure 12:
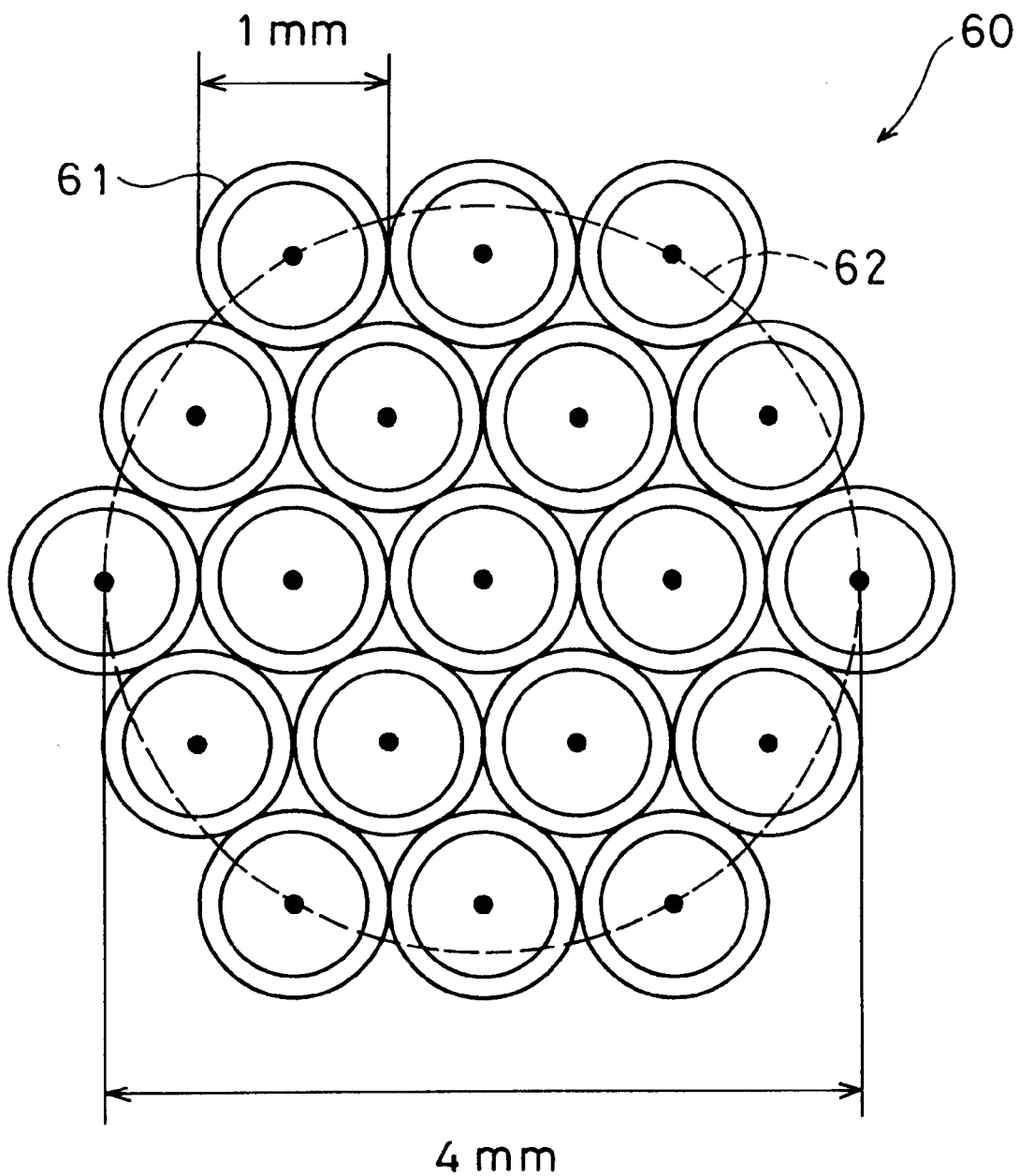
FIG. 12 is a view showing a laser beam outgoing end of a fiber bundle in which laser media of single mode fiber lasers are simply bundled.

FIG. 12 shows a laser beam outgoing end of a fiber bundle in which a plurality of fibers are simply bundled. The fiber bundle 60 illustrated in the figure comprises a bundle of nineteen fibers 61. Each fiber 61 has a core at its center. The core has a diameter on the order of 10 $\mu$m. The core is surrounded by a first clad having a diameter of 900 $\mu$m. The first clad is surrounded by a second clad having a diameter of 1 mm (1000 $\mu$m).

If the nineteen fibers 61 are arranged as illustrated in the figure, the laser output is equal to 2.85 kW corresponding to nineteen times that of a single fiber whole an emission region 62 has a diameter of about 4 mm. Therefore, the luminance P2 is given by:

$$P2 = \text{Output Power}/\text{Area of Emission Region} \qquad (2)$$
$$= 150 \text{ W} \times 19/1.256 \times 10^{-1}$$
$$= \text{about 22.7 kW/cm}^2$$

As will be understood from the comparison between the luminance P1 and P2, the luminance P2 is remarkably decreased as compared with the luminance P1 obtained by the single fiber. This means that the condensability important in laser machining is considerably decreased. This is because, in case where the fiber lasers of a single transverse mode are simply bundled, the average output power can be increased in proportion to the number of fibers but the cores as emission points are dotted in a wide space since each core is surrounded by the clad for greater than the core (100 times in diameter).

Consideration will now be made about a fiber bundle of this invention which comprises a bundle of fibers each having the output power of 150W.

Figure 13:
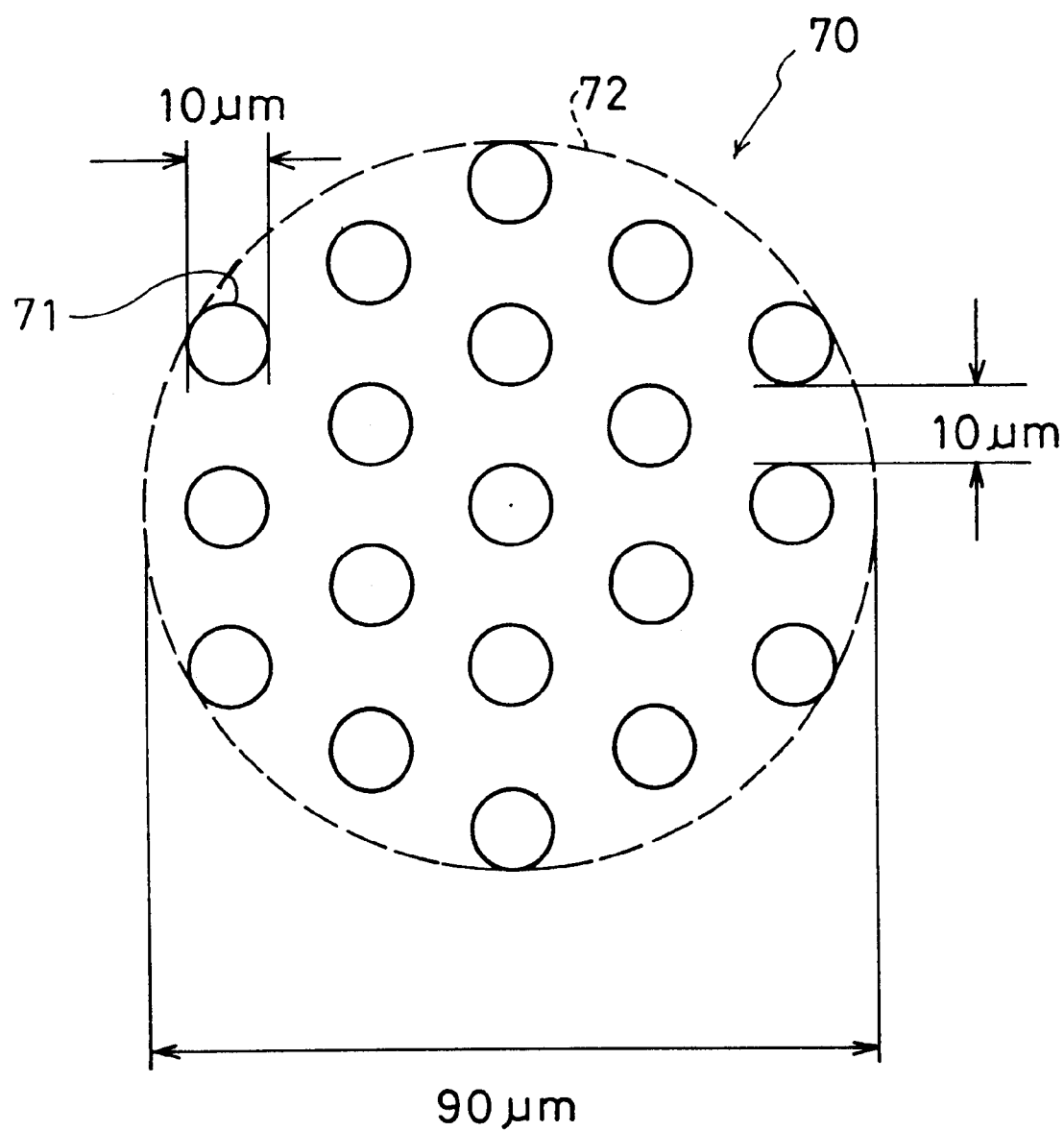
FIG. 13 is a view showing the arrangement of cores at the laser beam outgoing end of the fiber bundle according to this invention.

FIG. 13 shows an arrangement of cores at a laser beam outgoing end of the fiber bundle according to this invention. The fiber bundle 70 illustrated in the figure comprises the nineteen cores 71 having a core diameter of 10 μm and arranged at an interval of 10 μm. In this case, an emission region 72 of nineteen laser beams has a diameter of 90 μm.

Then, the laser output is equal to 2.85 kW corresponding to nineteen times that of the single fiber. An average luminance P3 is given by:

$$P3 = \text{Output Power/Area of Emission Region} \quad (3)$$
$$= 150 \text{ W} \times 19/6.3585 \times 10^{-5}$$
$$= \text{about } 45 \text{ MW/cm}^2$$

Thus, as compared with the luminance P2 in case where the fibers are simply bundled, the average luminance P3 is very high.

By the use of the above-mentioned laser apparatus as a laser machining apparatus, it is possible to carry out high-accuracy machining at a high speed.

Figure 14:
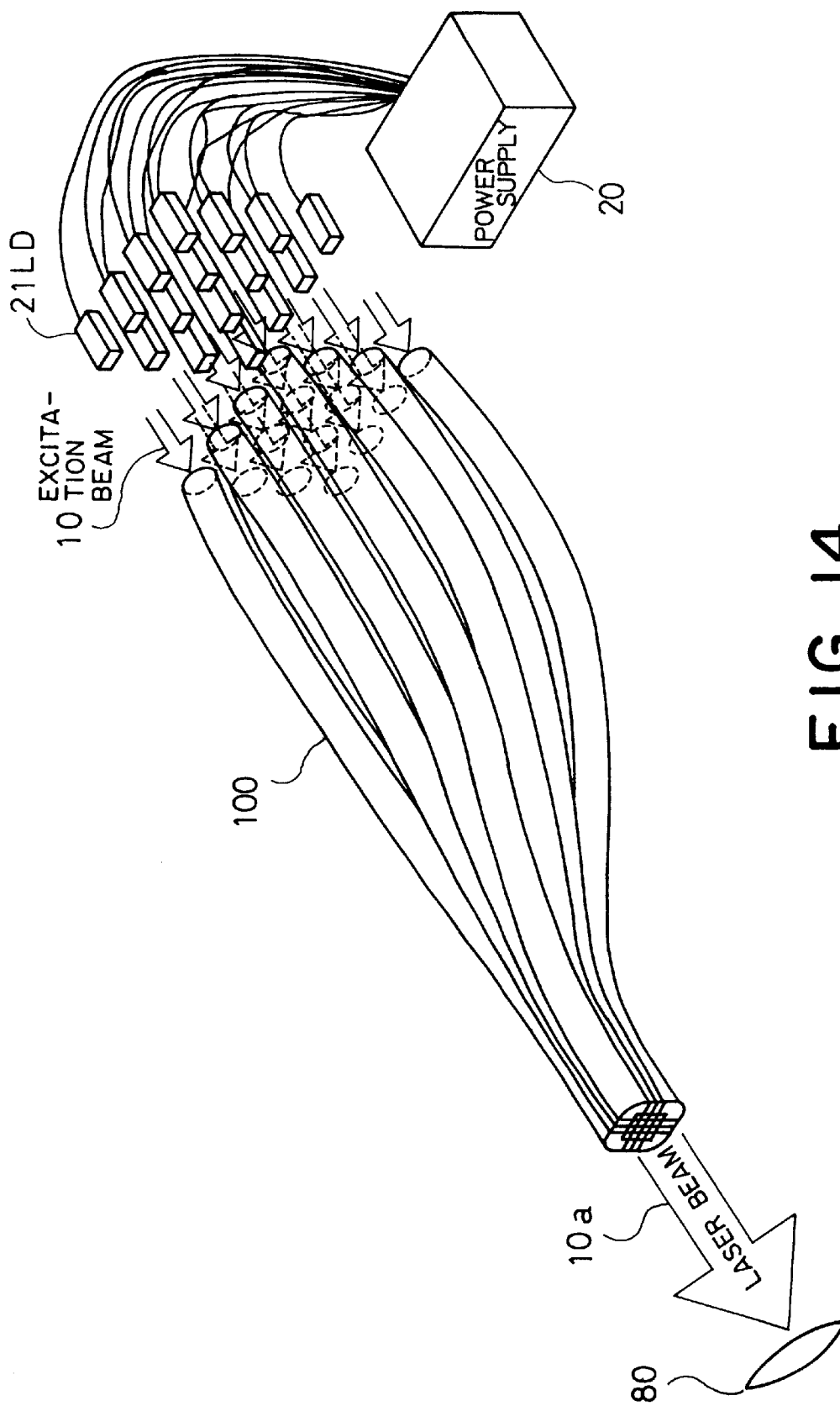
FIG. 14 is a view showing a laser machining apparatus using the fiber bundle of this invention.

FIG. 14 shows the laser machining apparatus which is similar to the laser apparatus of FIG. 7 except for the following.

In FIG. 14 when the optical fiber laser apparatus comprising the fiber bundle of this invention is used as the laser machining apparatus, a machining head (not shown) is provided at the laser beam outgoing side of the fiber bundle. A condensing lens 80 is arranged in the machining head to condense the laser beams onto a workpiece. An auxiliary gas is introduced into the machining head to be injected from a top end of the machining head. The auxiliary gas may be a shield gas for preventing oxidization or a plasma treating gas for removing a generated plasma. The laser machining apparatus is provided with a workpiece mounting table and a servo motor for moving the table. By the use of a numerical control unit for controlling the laser output and the position of the workpiece, precision machining can be performed.

EXAMPLE

Now, description will be made about a specific example of the fiber bundle according to the first embodiment illustrated in FIG. 1.

Herein, the fiber bundle was prepared by the use of sixteen double clad fibers having a core diameter of 10 μm, a first-clad diameter of 900 μm, a second-clad diameter of 1000 μm, and a length of 50 m. The core of each fiber was doped with Nd$^{3+}$ ions at a concentration of 0.5 at %. As a material of the fibers, a silica-based glass was used.

The excitation beam incident end is polished into a flat surface so that the excitation beam is efficiently introduced, and is coated with a multilayer film having a transmittance of 95% or more for the excitation beam of 0.8 μm and a reflectance of 98% or more for the laser oscillation wavelength of 1.06 μm. At the laser beam outgoing end, the fibers are bundled with the cores arranged at an interval of 10 μm.

For convenience of illustration, the total length of the fibers is short in FIG. 1. Practically, the length of each single fiber is equal to 50 m. Since the optical fibers are excellent in flexibility as well known, the fibers are wound around a bobbin having a diameter of about 20 cm although not illustrated in the figure.

The laser apparatus using this fiber bundle was excited by the use of the sixteen LDs having an oscillation wavelength of 0.8 μm and output power 20 W. As a result, laser beams having a wavelength of 1.06 μm and output power of 120 W were obtained.

The output of the laser apparatus was condensed by a lens system having a focal length of 50 mm. As a result, the energy corresponding to 90% or more of the output was condensed within an area having a diameter of 50 μm. As compared with a typical large-output YAG (Yttrium Aluminum Garnet) laser having a condensing diameter of 500 μm or more under the same condition, the condensing diameter is as small as 1/10 or less. Since the energy density at a condensing point is inverse proportional to the area of the condensing point, the energy density is as high as 100 times or more as compared with the typical large-output YAG laser. In addition, the condensing diameter of the laser apparatus is constant regardless of the laser output or a thermal condition. Therefore, stable laser machining is possible.

In the above-mentioned example, the LDs for excitation are small in number so that the output power is no more than 120 W. However, this value of the output power is not a limit of this laser apparatus. By increasing the output power of the excitation beam, the output power of the laser apparatus can further be increased. The upper limit is believed to be 2 kW or more.

As described above, in the fiber bundle according to this invention, the cores at the laser beam outgoing end are arranged adjacent to one another at the interval such that the transverse modes of laser oscillation do not affect one another. Therefore, if this fiber bundle is used in the optical fiber laser apparatus, it is possible to obtain the laser beam which has the transverse mode allowing stable laser machining and which is high in luminance and output power.

In the method of manufacturing the fiber bundle according to this invention, the fibers are bundled after the clads are partly removed. Therefore, it is possible to manufacture the fiber bundle in which the cores at the laser beam outgoing end are arranged adjacent to one another at the interval such that the transverse modes of laser oscillation do not effect one another.

As described above, in the laser apparatus according to this invention, the cores at the laser beam outgoing end are arranged adjacent to one another at the interval such that the transverse modes of laser oscillation do not affect one another. Therefore, it is possible to obtain the laser beam which has the stable transverse mode and which is high in luminance and output power.

In the laser machining apparatus of this invention, the cores at the laser beam outgoing end are arranged adjacent to one another at the interval such that the transverse modes of laser oscillation do not affect one another. Therefore, it is possible to perform laser machining using the laser beam which has the stable transverse mode and which is high in luminance and output power. Thus, high-accuracy laser machining can be performed at a high speed.

What is claimed is:

1. A laser apparatus for producing an output laser beam, wherein:
   said laser apparatus comprising:
      a fiber bundle in which in which one ends of a plurality of optical fibers are bundled as a bundled portion, said optical fibers including cores, respectively, each of said cores including a laser active material which produces a laser beam propagated through each of said cores towards said one end of said optical fibers, said fiber bundle outputting the laser beams from said one ends of the optical fibers collectively as said output laser beam; and exciting means for exciting said laser active material of each of said cores to make said laser active material of each of said cores produce said laser beam;

said fiber bundle comprising in said bundled portion:
a clad having a refractive index less than that of each of said cores and surrounding said cores so that said cores are positioned near to each other with a minimum distance left between two adjacent ones of said cores, said minimum distance being decided so that transverse modes of the laser beams propagated through said two adjacent ones of the cores do not affect each other;

different ends of said fibers being kept separated as a separated portion without being bundled in said fiber bundle;

said fiber bundle comprising in said separated portion:
first clads, each of which has a first refractive index less than that of each of said cores and surrounds each of said cores; and second clads, each of which has a second refractive index less than that of each of said first clads and surrounds each of said first clads.

2. A laser apparatus as claimed in claim 1, wherein said exciting means excites the laser active material of each of said cores by introducing an excitation beam into the first clad of said different end of each of said optical fibers.

3. A laser apparatus as claimed in claim 1, wherein said laser apparatus further comprises:
condensing means for condensing said output laser beam as a condensed laser beam.

* * * * *